United States Patent [19]
Miura et al.

[11] 4,263,783
[45] Apr. 28, 1981

[54] EXHAUST GAS PURIFICATION SYSTEM FOR AN INTERNAL COMBUSTION ENGINE

[75] Inventors: Motohisa Miura, Toyota; Shojiro Nagano; Naohiro Naganuma, both of Kariya; Mikiji Ito, Nagoya, all of Japan

[73] Assignee: Nippondenso Co., Ltd., Kariya, Japan

[21] Appl. No.: 919,833

[22] Filed: Jun. 28, 1978

[30] Foreign Application Priority Data

Jul. 4, 1977 [JP] Japan .................................. 52/79642

[51] Int. Cl.³ ........................ F01N 3/10; F02M 25/06
[52] U.S. Cl. ...................................... 60/278; 60/290; 60/307; 123/568
[58] Field of Search ................. 60/278, 289, 290, 307; 123/119 A, 568

[56] References Cited

U.S. PATENT DOCUMENTS

| | | | |
|---|---|---|---|
| 3,203,168 | 8/1965 | Thomas | 60/286 |
| 3,796,049 | 3/1974 | Hayashi | 60/278 |
| 3,885,538 | 5/1975 | Suter | 60/278 |
| 3,921,396 | 11/1975 | Nohira | 60/306 |
| 3,945,205 | 3/1976 | Atago | 60/289 |
| 4,085,586 | 4/1978 | Shibata | 60/307 |
| 4,096,692 | 6/1978 | Nakamura | 60/307 |

*Primary Examiner*—Douglas Hart
*Attorney, Agent, or Firm*—Cushman, Darby & Cushman

[57] ABSTRACT

An engine exhaust gas purification system includes an EGR line for the recirculation of exhaust gases from an engine exhaust system back into an intake system thereof. An EGR valve is provided in the EGR line to control the rate of EGR. The EGR valve is actuated by an actuator which is operated by pressurized air supplied by a diaphragm pump driven by the engine in proportion to the engine speed. The pressure of the pressurized air is substantially proportional to the engine speed, whereby the EGR rate is controlled so as to be substantially proportional to the engine speed.

4 Claims, 3 Drawing Figures

4,263,783

EXHAUST GAS PURIFICATION SYSTEM FOR AN INTERNAL COMBUSTION ENGINE

BACKGROUND OF THE INVENTION

1. Field of the Invention

The present invention relates to an exhaust gas purification system for an internal combustion engine.

2. Description of the Prior Art

Exhaust gas purification systems are known each of which comprises either simply a secondary air supply system or an exhaust gas recirculation system, or both of them. Many of the known exhaust gas purification systems are arranged such that the speed of the engine operation is electrically detected to emit an electric signal to a solenoid valve or valves for the control of the rate of the secondary air supply and/or the rate of exhaust gas recirculation in relation to the engine speed. The known exhaust gas purification systems of this type, however, fail to provide a satisfactory volumetrically proportional control.

SUMMARY OF THE INVENTION

It is, therefore, an object of the present invention to provide an improved exhaust gas purification system in which a control valve for the system is controlled substantially in proportion to the speed of the engine operation.

The exhaust gas purification system according to the present invention comprises an EGR passage extending between the engine intake and exhaust systems for the recirculation of the engine exhaust gases from the exhaust system back into the intake system; an EGR valve means including a valve member disposed in the EGR passage to control the rate of the exhaust gas recirculation and an actuator for the valve member; the actuator including a pressure chamber and a diaphragm bordering the pressure chamber and operatively connected to the valve member; and diaphragm pump means driven by an associated engine in proportion to the engine speed to produce pressurized air; the pressure of the pressurized air being substantially in proportion to the engine speed; the diaphragm pump means having an air delivery port pneumatically connected to the pressure chamber of the valve actuator so that the diaphragm is deformed by the pressurized air to actuate the valve member; the arrangement being such that the rate of the exhaust gas recirculation is controlled so as to be substantially in proportion to the engine speed.

The exhaust gas purification system according to the present invention may further include a secondary air supply system which comprises a secondary air supply line extending between the diaphragm pump and the engine exhaust system. A secondary air control valve means may be provided in the secondary air supply line.

The above and other objects, features and advantages of the present invention will be made apparent by the following description with reference to the accompanying drawings.

DESCRIPTION OF PREFERRED EMBODIMENTS

Figure 1:
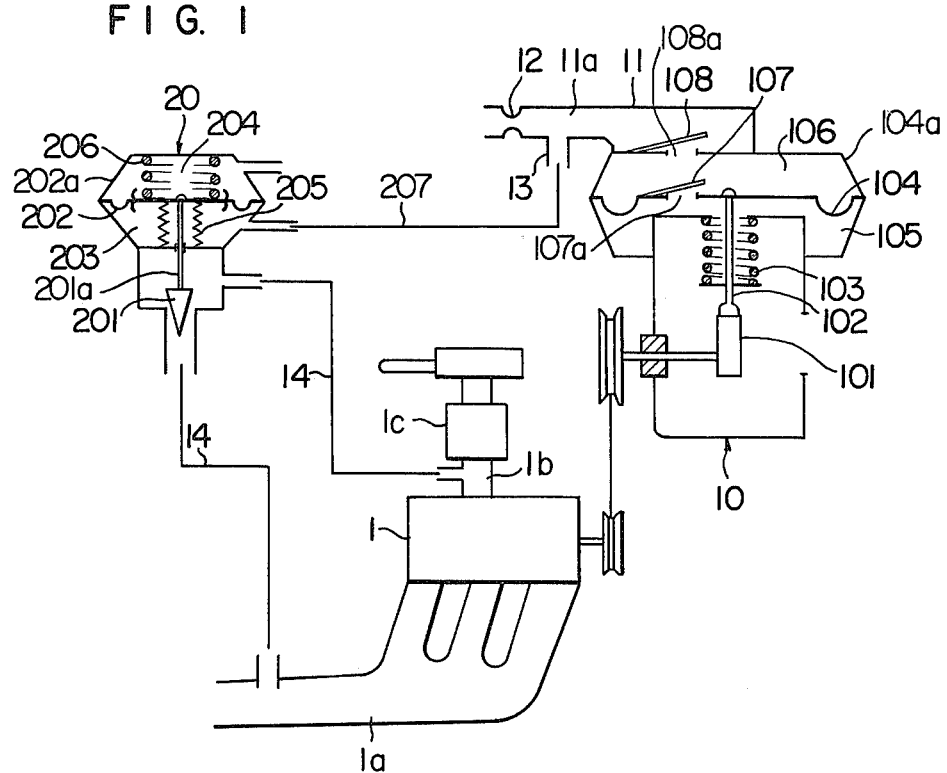
FIG. 1 is a diagrammatic illustration of a first embodiment of an exhaust gas purification system for an internal combustion engine according to the present invention.

Referring first to FIG. 1, an exhaust gas purification system includes a diaphragm pump 10 which includes a cam 101 drivingly connected by an endless belt to an output shaft of an internal combustion engine 1 so that the cam 101 is rotated. The rotational speed of the cam 101 is in proportion to the engine speed. A rod member 102 is resiliently urged by a spring 103 into sliding contact at one end with the periphery of the cam 101 so that the rotation of the cam reciprocally moves the rod 102 in axial direction. The other end of the rod 102 is fixed to a diaphragm 104 extending across the interior of a housing 104a to cooperate therewith to define a first pressure chamber 105 disposed on the side of the diaphragm 104 adjacent to the spring 103 and vented to the atmosphere, and a second pressure chamber 106 disposed on the side of the diaphragm 104 remote from the spring 103. The diaphragm 104 is provided with a first check valve 107 for opening and closing an opening 107a formed in the diaphragm. A second check valve 108 is provided on the housing 104a to open and close a discharge port 108a formed in the housing. The check valves 107 and 108 are arranged such that, when the diaphragm 104 is deflected toward the discharge port 108a by a working stroke of the rod 102, the check valves 107 and 108 are closed and opened, respectively, and when the diaphragm 104 is deflected toward the cam 101 by the return stroke of the rod 102, the check valves 107 and 108 are opened and closed, respectively, whereby the pump 10 produces a pressurized air which is discharged through the discharge port 108a. The discharge port 108a is enclosed by an enclosure 11 which cooperates with the housing 104a to define a pressure levelling chamber 11a which is vented to the atmosphere through a fixed restriction 12 and has a pressure delivery port 13.

The engine 1 has an exhaust system 1a and an intake system 1b. An exhaust gas return passage 14 (to be termed "EGR passage" hereinafter) extends from the exhaust system 1a to the intake system 1b downstream of a carburetor 1c which forms a part of the intake system 1b.

The flow of the engine exhaust gases from the exhaust system 1a through the EGR passage 14 back into the intake system 1b is controlled by a valve means 20 (to be termed "EGR valve" hereinafter). The EGR valve 20 includes a valve member 201 which is in the form of a needle valve disposed in the EGR passage 14 to control the gas-flowing sectional area of the passage 14. The valve member 201 is connected by a rod 201a to a diaphragm 202 extending across the interior of a housing 202a to cooperate therewith to define first and second chambers 203 and 204. The first chamber 203 is disposed on the side of the diaphragm 202 adjacent to the valve member 201, while the second chamber 204 is disposed on the side of the diaphragm 202 remote from the valve member 201. The first chamber 203 is pneumatically connected to the pressure delivery port 13 of the enclosure 11. A bellows member 205 extends between the diaphragm 202 and the housing 202a and around the rod 201a to form a deformable seal between the chamber 203 and the EGR passage 14. The second chamber 204 is vented to the atmosphere and provided with a compression spring 206 extending between the diaphragm 202 and the housing 202a to bias the diaphragm in a direction to bias the valve member toward its closed position.

In operation, when the diaphragm 104 of the diaphragm pump 10 is being deflected toward the cam 101, i.e., downwardly as viewed in FIG. 1, the second chamber 106 of the pump 10 is expanded and tends to decrease the pressure therein below the atmospheric pressure. Thus, the first check valve 107 is opened while the second check valve 108 is closed, so that the atmospheric pressure flows from the first chamber 105 through the opening 107a into the second chamber 106. The diaphragm 104 is then deflected upwardly to compress the air in the second chamber 106 with resultant pressure rise therein. The first and second check valves 107 and 108 are thus closed and opened, respectively, to allow the pressurized air to be discharged from the second chamber 106 through the discharge opening 108a into the pressure levelling chamber 11a. The restriction 12 provided for the pressure levelling chamber 11a functions to minimize the pressure pulsation in the chamber 11a.

Figure 2:
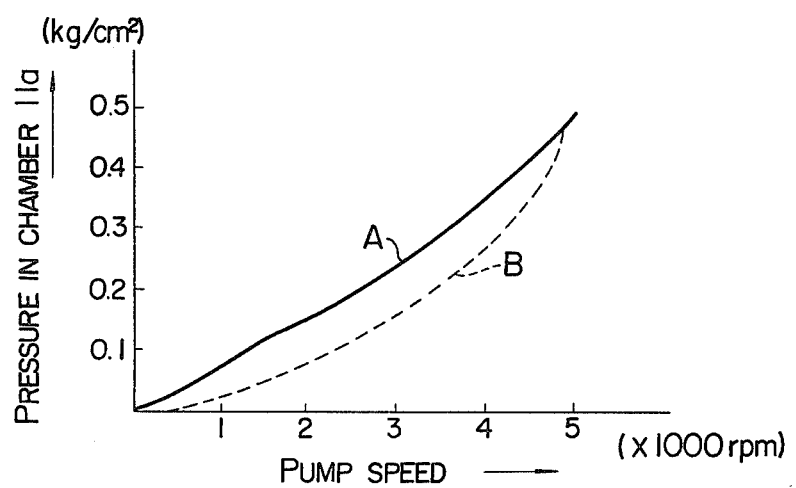
FIG. 2 graphically illustrates the discharge pressures of a diaphragm pump of the system shown in FIG. 1 and of a vane pump relative to the pump speed.

The air pressure in the pressure levelling chamber 11a depends upon the speed of the operation of the pump 10, i.e., the strokes of upward and downward reciprocal deflections of the diaphragm 104 per unit of time, and is substantially proportional to the speed of the pump 10, as shown by a solid line A in FIG. 2, and thus is proportional to the engine speed. The introduction of the air pressure of the described characteristic into the chamber 203 of the EGR valve 20 assures that the valve member 201 is actuated such that the gas-flowing cross-sectional area of the EGR passage 14 as controlled by the valve member 201 is substantially proportional to the engine speed, with a result that the flow of the exhaust gas from the exhaust system 1a through the EGR passage 14 back into the intake system 1b is substantially proportional to the speed of the operation of the engine 1.

If a conventional vane pump were used in place of the diaphragm pump 10 used in the system according to the present invention, the air pressure in the pressure levelling chamber 11a would vary as shown by the broken line B in FIG. 2 because of the presence of gaps between the vanes of the vane pump and the housing thereof. The air pressure curve B is not proportional to the engine speed and thus is not useful to control EGR in such a manner that the EGR is substantially proportional to the engine speed. In addition, vane pumps suffer from a great deterioration of air-discharging performance during operation. Moreover, the preciseness of manufacture of vane pumps is widely varied from one pump to another. Thus, a vane pump fails to accurately operate to produce an air pressure signal which can be used for the control of EGR substantially in proportion to the engine speed.

In the described and illustrated embodiment of the invention, the chamber 204 of the EGR valve 20 is vented to the atmosphere. This chamber, however, may alternatively be pneumatically connected to the intake system of the engine so that the EGR is responsive to variation in the engine speed represented by the pressure of air from the pump 10 as well as to variation in the engine load represented by the intake manifold vacuum. Further alternatively, the chamber 204 may be supplied with another vacuum or positive pneumatic pressure signal which is modulated in accordance with the intake manifold vacuum or the temperature of the engine cooling water so that the EGR valve 20 is responsive to variation not only in the engine speed but also in the engine load represented by the intake manifold vacuum or in the engine temperature represented by the colling water temperature.

The rod 102 driven by the cam 101 to drive the diaphragm 104 of the pump 10 may alternatively be driven by a lever member of a mechanical type fuel pump (not shown) rather than being driven by the engine output shaft as shown in FIG. 1.

Figure 3:
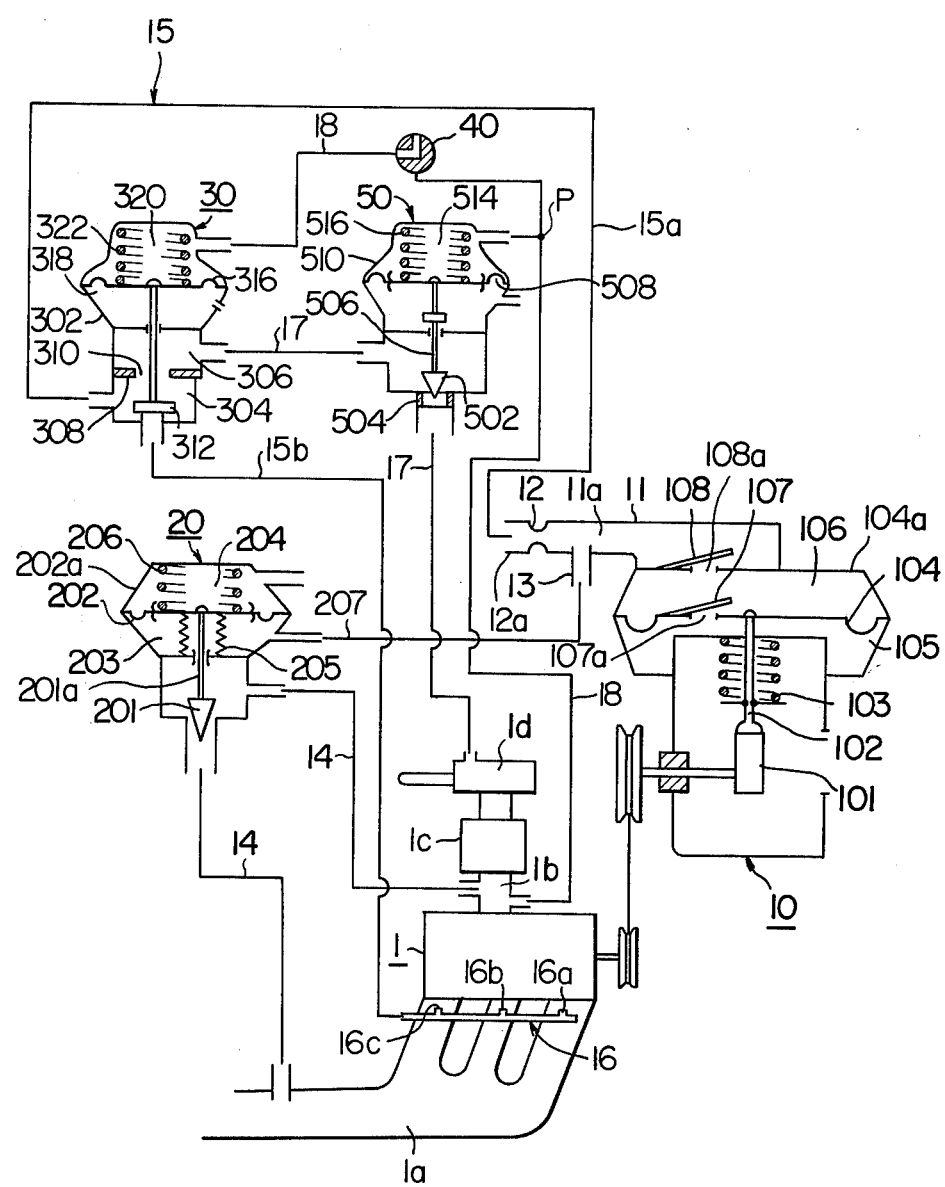
FIG. 3 is a diagrammatic illustration of a second embodiment of the present invention.

FIG. 3 illustrates a second embodiment of the invention which includes an EGR system and an EGR control means which are similar in structure and function to those of the first embodiment shown in FIG. 1. The parts of the second embodiment similar to those of the first embodiment are designated by similar reference numerals. Thus, it will be sufficient to describe only the difference of the second embodiment from the first embodiment.

In addition to the EGR line and the EGR control means similar to those of the first embodiment of the invention, the second embodiment includes a secondary air supply line generally designated by 15 and having an upstream part 15a connected at its upstream end to a second pressure delivery port 12a of the pump 10 provided in the enclosure 11 downstream of the restriction 12. A downstream part 15b of the secondary air supply line 15 terminates in an air injection nozzle tube 16 having conventional air injection nozzles 16a to 16c mounted on respective branches of an exhaust manifold of the engine 1 for the supply of secondary air into the exhaust system 1a. A valve 30 is provided to control the secondary air supply to the engine exhaust system 1a. The valve 30 comprises a valve housing 302 defining therein a first chamber 304 to which the downstream and upstream ends of the upstream and downstream parts 15a and 15b of the secondary air supply line 15 are connected. A second chamber 306 is provided in the housing 302 and separated from the first chamber 304 by a partition 308 in which an opening 310 is formed. The second chamber 306 is connected by a branch air line 17 to an air cleaner 1d of the intake system 1b of the engine 1. A valve member 312 is provided in the first chamber 304 to control or change-over the communication between the upstream part 15a of the secondary air supply line 15, the downstream part 15b thereof and the branch air line 17. The valve member 312 is operatively connected by a rod 314 to a diaphragm 316 which cooperates with the housing 302 to further define third and fourth chambers 318 and 320. The third chamber 318 is vented to the atmosphere, whereas the fourth chamber 320 is connected by a vacuum line 18 to the intake system 1b of the engine 1 downstream of the carburetor 1c so that vacuum in the intake manifold of the engine 1 is fed into the fourth chamber 320 of the valve 30. A compression coil spring 322 is provided in the fourth chamber 320 to bias the diaphragm in a direction to cause the valve member 312 to interrupt the communication between the upstream and downstream parts 15a and 15b of the secondary air supply line 15.

A change-over valve 40 is provided in the vacuum line 18 and actuated in response to variation in a selected engine operating parameter, such as the temperature of the engine cooling water or the engine speed, to change over the communication between the fourth chamber 320 of the valve 30, the engine intake system 1b and the atmosphere so that the supply of the secondary air into the engine exhaust system 1a is controlled according to the changes of the selected engine operating parameter. In the illustrated embodiment of the invention, the valve 40 is operated to switch over the communication between the chamber 320, the engine intake system 1b and the atmosphere when the temperature of the engine cooling water exceeds a predetermined temperature (15° C., for example) so that, when the temperature in the engine cooling water is below the predetermined temperature, the atmospheric pressure is introduced into the chamber 320 to deform the diaphragm 316 downwardly thereby for causing the valve member 312 to disconnect the downstream part 15b of the secondary air supply line 15 from the upstream part 15a thereof. At this time, therefore, the pressurized air from the second air delivery port 12a of the air pump 10 is not injected through the air injection nozzles 16a to 16c into the exhaust system 1a of the engine 1 but flows from the chamber 304 of the valve 30 through the opening 310 in the partition 308, through the second chamber 306 and through the branch line 17 into the air cleaner 1d of the engine. When the temperature of the engine cooling water exceeds the predetermined temperature, the change-over valve 40 is rotated to introduce the engine manifold vacuum into the chamber 320 so that the diaphragm 316 is deformed upwardly against the compression spring 322 to move the valve member 312 into sealing engagement with the partition 308 around the opening 310. Thus, the air from the air pump 10 now flows through the line 15b into the exhaust system 1a of the engine 1.

It will be noted that, when the valve member 312 of the valve 30 is in a position to disconnect the downstream part 15b of the secondary air supply line 15 from the upstream part 15a thereof, as shown in FIG. 3, the pressure in the downstream part 15b of the secondary air supply line 15 is substantially equal to the exhaust gas pressure or the engine backpressure in the exhaust system 1a of the engine 1. The engine backpressure is varied with the load on the engine and increased and decreased when the engine load is increased and decreased, respectively. It will be appreciated that, if the valve member 312 is moved from the position shown in FIG. 3 to a position in which the upstream and downstream parts 15a and 15b of the secondary air supply line 15 is communicated with each other, the chamber 11a of the pump 10 is suddenly exposed to the pressure in the downstream part 15b of the secondary air supply line 18, i.e., the exhaust gas pressure in the engine exhaust system 1a, so that the pressure in the chamber 11a is varied abruptly. Such an abrupt variation in the pressure in the chamber 11a is undesirable because the pressure in the chamber 11a is utilized for the EGR control substantially in proportion to the engine speed.

In order to avoid or minimize such an undesirable abrupt variation in the air pressure in the chamber 11a, therefore, a valve 50 is provided in the line 17 between the valve 30 and the air cleaner 1d of the engine intake system 1b. This valve 50 includes a needle valve 502 which is operative to vary the air-flowing sectional area defined by a valve seat 504 provided in the line 17. The needle valve 502 is operatively connected by a rod 506 to a diaphragm 508 which extends across the interior of a housing 510 to cooperate therewith to define first and second chambers 512 and 514. The first chamber 512 is vented to the atmosphere, while the second chamber 514 is connected to the vacuum line 18 at a point P between the valve 40 and the intake system 1b of the engine 1.

The air-flowing sectional area of the line 17 as controlled by the cooperation of the valve seat 504 and the needle valve 502 is decreased and increased when the vacuum in the intake system 1b of the engine 1 is decreased and increased, respectively. The engine intake manifold vacuum is decreased and increased when the load on the engine is increased and decreased, respectively. The backpressure of the engine in the exhaust system 1a and thus in the downstream part 15b of the secondary air supply line 15 is increased and decreased when the engine load is increased and decreased, respectively. The decrease and increase in the air-flowing sectional area of the line 17 as controlled by the needle valve 502 results in an increase and a decrease in the air pressure in the line 17 upstream of the valve 50 and thus in the upstream part 15a of the secondary air supply line 15, respectively. This pressure forms a part of the backpressure of the air pump 10 and thus is increased and decreased when the engine load is increased and decreased, respectively. Thus, the pressure in the chamber 11a, i.e., the backpressure of the pump, is varied substantially in proportion to the engine load and thus can be made substantially equal to the engine backpressure present in the downstream part 15b of the secondary air supply line 15. Accordingly, even if the valve member 312 is suddenly moved from the position shown in FIG. 3 to disconnect the secondary air supply line part 15a from the line 17 and connect the line part 15a to the line part 15b, no abrupt variation occurs in the air pressure in the chamber 11a of the pump 10.

What is claimed is:

1. An exhaust gas purification system for an internal combustion engine having intake and exhaust systems, comprising:
   passage means extending between said intake and exhaust systems for recirculating engine exhaust gases from said exhaust system back into said intake system;
   first valve means including a first valve member disposed in said EGR passage for controlling the rate of exhaust gas recirculation and an actuator for said first valve member, said actuator including a first pressure chamber and a first diaphragm bordering said first pressure chamber and operatively connected to said first valve member;
   diaphragm pump means driven by said engine in proportion to the engine speed for producing pressurized air, the pressure of the pressurized air being substantially in proportion to the engine speed;
   said diaphragm pump means having means defining a pressure leveling chamber for leveling the pressure of the discharges from said diaphragm pump means, said leveling chamber means having first and second air delivery ports, said first air delivery port being pneumatically connected to said first pressure chamber of said actuator so that said first diaphragm is deformed by pressurized air to actuate said first valve member, whereby the rate of the exhaust gas recirculation is controlled so as to be substantially in proportion to engine speed;
   a secondary air supply system including a secondary air supply line extending between said second air delivery port and said exhaust system and control means responsive to a variation in an engine operating parameter for controlling the secondary air supply;

said control means including a second valve means for controlling flow of secondary air, said second valve means including a second valve member disposed in said secondary air supply line, a second pressure chamber pneumatically connected to said intake system by a vacuum line, a second diaphragm bordering said second pressure chamber and operatively connected to said second valve member, said vacuum line including a third valve member movable between two operative positions, one connecting vacuum from said intake system through said vacuum line to said second pressure chamber to move said second valve member to a first position allowing pressurized air from said diaphragm pump means to flow to said exhaust system, the other operative position connecting said second pressure chamber to the atmosphere so that said second valve member is moved to a second position interrupting the secondary air supply to said exhaust system, said third valve member being changed from one operative position to another in response to predetermined engine operating conditions;

said second valve means further including means defining an air-flowing space having first, second and third ports, said secondary air supply line comprising upstream and downstream parts having downstream and upstream ends connected to said last mentioned first and second ports, respectively, said second valve member being operative to control the communication between said first and second ports of said air-flowing space;

said secondary air supply system further including fourth valve means responsive to variations in the engine load for controlling the rate of flow of air from said first port of said air-flowing space through said third port thereof when said second valve member is in said second position such that the air pressure in said air-flowing space and thus in said air levelling chamber is made substantially equal to the engine backpressure in said exhaust system and thus in the downstream part of said secondary air supply line.

2. The exhaust gas purification system according to claim 1, wherein said second air delivery port is provided with a fixed restriction.

3. The exhaust gas purification system according to claim 1, wherein said engine operating parameter is derived from the temperature of the engine cooling water, the arrangement being such that said second valve member is moved to said second position when the engine cooling water is at a temperature below a predetermined temperature and such that said second valve member is moved to its first position when the engine cooling water is heated beyond said predetermined temperature.

4. The exhaust gas purification system according to claim 1, wherein said third port of said air-flowing space is connected to said intake system by a branch air line, and wherein said fourth valve means includes a fourth valve member operative in response to variation in the vacuum in said intake system to control the flow of the air from said second valve means through said branch air line into said intake system, the arrangement being such that the air flow through said branch air line is increased and decreased when the intake vacuum is increased and decreased to decrease and increase the pressure in said pressure levelling chamber, respectively, whereby the back pressure of said diaphragm pump means is made substantially equal to the engine backpressure in said exhaust system and thus in said downstream part of said secondary air supply line.

* * * * *